(12) United States Patent
Yasunori

(10) Patent No.: US 10,559,856 B2
(45) Date of Patent: Feb. 11, 2020

(54) BATTERY

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Hiromichi Yasunori, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

(*) Notice: Subject to any disclaimer, the term of this patent is extended or adjusted under 35 U.S.C. 154(b) by 221 days.

(21) Appl. No.: 15/538,818

(22) PCT Filed: Jan. 5, 2016

(86) PCT No.: PCT/JP2016/050088
§ 371 (c)(1),
(2) Date: Jun. 22, 2017

(87) PCT Pub. No.: WO2016/114166
PCT Pub. Date: Jul. 21, 2016

(65) Prior Publication Data
US 2017/0352924 A1 Dec. 7, 2017

(30) Foreign Application Priority Data
Jan. 15, 2015 (JP) .................. 2015-005856

(51) Int. Cl.
*H01M 10/42* (2006.01)
*H01M 10/613* (2014.01)
(Continued)

(52) U.S. Cl.
CPC ..... *H01M 10/4207* (2013.01); *H01M 2/1077* (2013.01); *H01M 2/206* (2013.01);
(Continued)

(58) Field of Classification Search
CPC ......... H01M 10/4207; H01M 10/425; H01M 10/4257; H01M 10/46; H01M 10/482;
(Continued)

(56) References Cited

U.S. PATENT DOCUMENTS 5,929,600 A 7/1999 Hasegawa
2013/0157102 A1 6/2013 Nagamatsu et al.

FOREIGN PATENT DOCUMENTS

JP H07-50157 A 2/1995
JP H08-334302 A 12/1996
(Continued)

OTHER PUBLICATIONS

Search Report for Int'l Appln. No. PCT/JP2016/050088, dated Apr. 5, 2015 (1 pg.).

*Primary Examiner* — Carlos Barcena
(74) *Attorney, Agent, or Firm* — Honigman LLP

(57) ABSTRACT

A battery comprises: a plurality of cells each of which has two electrodes; a control unit with a circuit board; and a housing that contains the cells and the control unit. The housing is provided with a first terminal and a second terminal. The cell, which is disposed closest to the first terminal, is connected to the first terminal; and the cell, which is disposed adjacent to the control unit, is connected to the second terminal via the control unit. Among the cells and the control unit, the control unit is disposed closest to the second terminal. A bus bar is provided between the cell and the cell so as to serve as a folding portion that folds back the current path between the first and second terminals.

14 Claims, 2 Drawing Sheets

(51) Int. Cl.
*H01M 10/48* (2006.01)
*H01M 10/46* (2006.01)
*H01M 10/625* (2014.01)
*H01M 10/6551* (2014.01)
*H01M 10/6554* (2014.01)
*H02J 7/00* (2006.01)
*H01M 2/10* (2006.01)
*H01M 2/20* (2006.01)

(52) U.S. Cl.
CPC ..... *H01M 10/425* (2013.01); *H01M 10/4257* (2013.01); *H01M 10/46* (2013.01); *H01M 10/482* (2013.01); *H01M 10/613* (2015.04); *H01M 10/625* (2015.04); *H01M 10/6551* (2015.04); *H01M 10/6554* (2015.04); *H02J 7/0042* (2013.01); *H01M 2010/4271* (2013.01); *H01M 2220/20* (2013.01)

(58) Field of Classification Search
CPC ............ H01M 10/613; H01M 10/625; H01M 10/6551; H01M 10/6554; H01M 2010/4271; H01M 2220/20; H01M 2/1077; H01M 2/206; H02J 7/0042
See application file for complete search history.

(56) References Cited

FOREIGN PATENT DOCUMENTS

| | | |
|---|---|---|
| JP | H09-274903 A | 10/1997 |
| JP | 2002-343320 A | 11/2002 |
| JP | 2003-177001 A | 6/2003 |
| JP | 2004-095357 A | 3/2004 |
| JP | 2007-202341 A | 8/2007 |
| JP | 2011-060614 A | 3/2011 |
| JP | 2012-2706 A | 1/2012 |
| JP | 2012-119147 A | 6/2012 |
| JP | 2013-125612 A | 6/2013 |
| JP | 2014-116328 A | 6/2014 |
| JP | 2014-123516 A | 7/2014 |
| JP | 2015-062153 A | 4/2015 |

FIG. 3
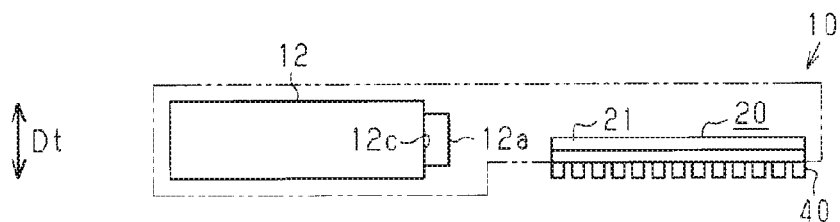
FIG. 4
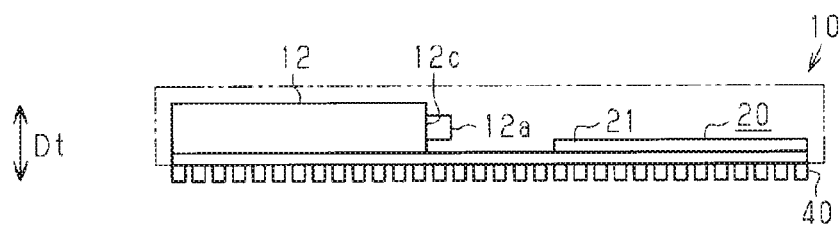
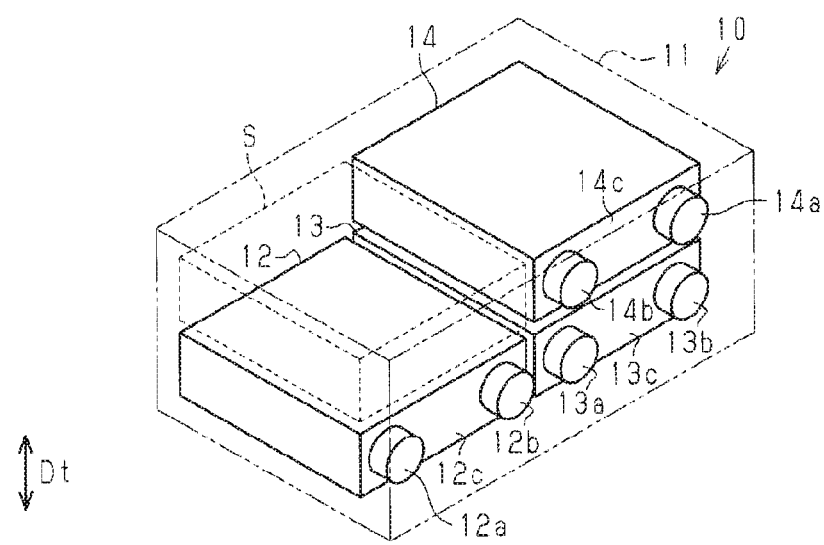
FIG. 5

BATTERY

CROSS-REFERENCE TO RELATED APPLICATIONS

This application is the U.S. national stage of PCT/JP2016/050088 filed Jan. 5, 2016, which claims priority of Japanese Patent Application No. JP 2015-005856 filed Jan. 15, 2015.

TECHNICAL FIELD

The present invention relates to a battery that has an odd number of cells.

BACKGROUND

Conventionally, batteries have been well known that have a plurality of combined cells (electric cells). Such batteries are used, for example, in vehicles (see JP 2013-125612A, for example).

In such a battery, two stacks of cells having an approximate shape of a flat box (hexahedron) are arranged side by side (in two rows) to form a single module. In the foregoing stacks, the cells are stacked together by bringing the sides with the largest surface area of each cell's six sides into contact with one another. This makes the thickness of the stacks of cells in the stacking direction relatively thin.

The above-described battery may contain in its housing a plurality of cells and a control unit for controlling the charge and discharge of the cells. Each cell and the control unit are connected with each other by wiring members. Each cell and the control unit are also connected with the two terminals provided on the housing by wiring members. Depending on the arrangement of the plurality of cells and the control unit in the housing, the wiring members may disadvantageously have an intricate configuration and also become long.

An object of the present invention is to provide a battery that can shorten the wiring members used therein.

SUMMARY

A battery according to the present invention comprises: a plurality of cells, each of which has two electrodes; a control unit for controlling charge and discharge of the plurality of cells, the control unit having a circuit board; and a housing that contains the plurality of cells and the control unit, the housing having a first side on which first and second terminals are provided. The first and second terminals are arranged on the first side, facing in the same direction. The one of the plurality of cells that is disposed closest to the first terminal (referred to as "the terminal side cell" hereinafter) is connected to the first terminal. The cell disposed adjacent to the control unit (referred to as "the control unit side cell" hereinafter) is connected to the second terminal via the control unit. The control unit is disposed closest to the second terminal among the plurality of cells and the control unit. A folding portion that folds back a current path between the first and second terminals is provided between the terminal side cell and the control unit side cell.

According to this configuration, as the current path between the first and second terminals is folded back by the folding portion, it is possible to shorten the current path between the first and second terminals, which face the same direction. This makes it possible to shorten the wiring member.

In the foregoing battery, it is preferred that the plurality of cells are arranged in two rows so that the two electrodes of each cell oppose those of another, that the two adjacent cells in each row are arranged so that electrodes of different polarities are adjacent to each other, that the adjacent electrodes of different polarities are electrically connected to each other, that the folding portion is located closer to a second side of the housing than to the first side of the housing, the second side being located opposite to the first side, and that the folding portion is composed of a wiring member that connects electrodes of different polarities of at least one pair of opposite cells in the different rows.

According to this configuration, as the electrodes of the cells in each row oppose those in the other, it is possible to shorten the distance between the electrodes of the cells in each row and those in the other and thus to shorten the wiring member that forms the folding portion. In addition, as the differently polarized electrodes of two adjacent cells are located close to each other, it is possible to further shorten the wiring member and thus the current path.

In the foregoing battery, it is preferred that the plurality of cells are arranged in two tiers so that the two electrodes of the plurality of cells all face the same direction, two adjacent cells in each tier are arranged so that electrodes of different polarities are adjacent to each other, the adjacent electrodes of different polarities are electrically connected to each other, the folding portion is located closer to a second side of the housing than to the first side of the housing, the second side being located opposite to the first side, and the folding portion is composed of a wiring member that connects electrodes of different polarities of two cells in the different tiers.

According to this configuration, as all of the electrodes of each cell face the same direction, the distance between the connected electrodes can be shortened, thus shortening the wiring member that forms the folding portion. In addition, as the differently polarized electrodes of adjacent cells are located close to each other, it is possible to further shorten the wiring member and thus the current path.

In the foregoing battery, it is preferred that the outer contour of the plurality of cells has approximately a shape of a polygonal column or a cylinder, that the two electrodes protrude from one surface of each cell in the same direction, and that the control unit is equal in size to a rectangular solid having the smallest possible volume that can contain one of the plurality of cells or is sized to be contained in that rectangular solid.

According to this configuration, as the control unit is smaller than or equal in size to a rectangular solid having the smallest possible volume that can contain one cell, the cells and the control unit can be efficiently arranged in the housing.

In the foregoing battery, it is preferred that the housing has an approximate shape of a flat box and contains three or a greater odd number of the cells, and the control unit.

According to this configuration, the cells and the control unit can be efficiently arranged in the housing.

In the foregoing battery, it is preferred that a radiator member is provided on the control unit.

According to this configuration, heat can be dissipated from the control unit by the radiator member. Additionally, if the thickness of the control unit is, for example, smaller than that of a cell, the size of the battery as a whole can be limited in the thickness direction of the cells by providing the radiator member only on the control unit.

In the foregoing battery, it is preferred that the radiator member is in contact with part of the plurality of cells.

According to this configuration, heat can also be dissipated from the cells in contact with the radiator member.

In the foregoing battery, the control unit includes a current detection circuit, a voltage step-up and down circuit, and a control circuit on the circuit board, and the current detection circuit and the voltage step-up and down circuit are arranged on the circuit board to face the same direction as the electrodes of the control unit side cell.

According to this configuration, as the current detection circuit and the voltage step-up and down circuit, which tend to generate heat, are arranged close to the electrodes of the cells forming the current path, thermal diffusion can be minimized.

According to the battery of the present invention, it is possible to shorten the wiring members used therein.

BRIEF DESCRIPTION OF DRAWINGS

FIG. 3 is a schematic side view of the battery according to the embodiment of FIG. 1, depicting the structure for radiation of heat from the battery.

FIG. 4 is a schematic side view of the battery according to the embodiment of FIG. 1, depicting a different structure for radiation of heat from the battery.

FIG. 5 is a schematic diagram of the battery according to a different embodiment.

DETAILED DESCRIPTION OF THE PREFERRED EMBODIMENTS

An embodiment of the present invention will be described hereinafter.

Figure 1:
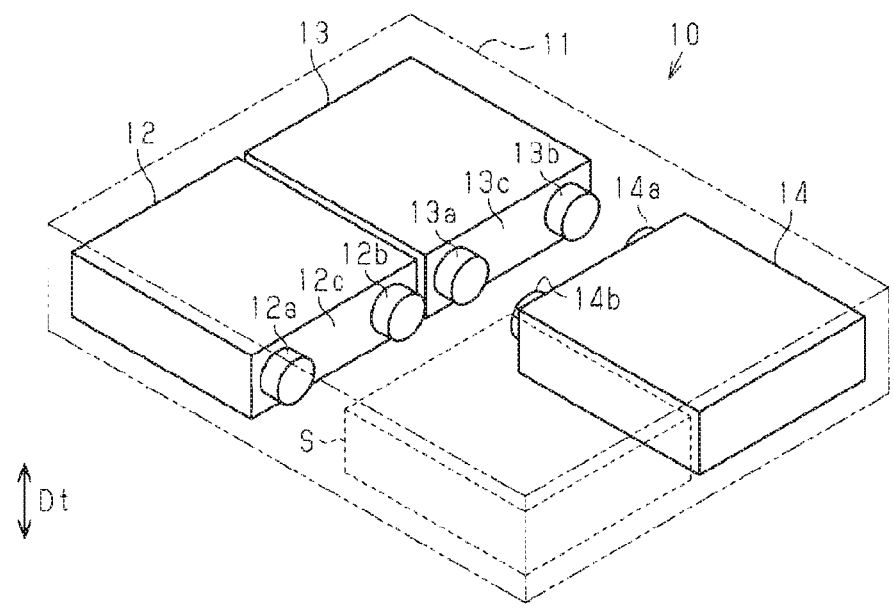
FIG. 1 is a schematic diagram of a battery according to one embodiment.
Figure 2:
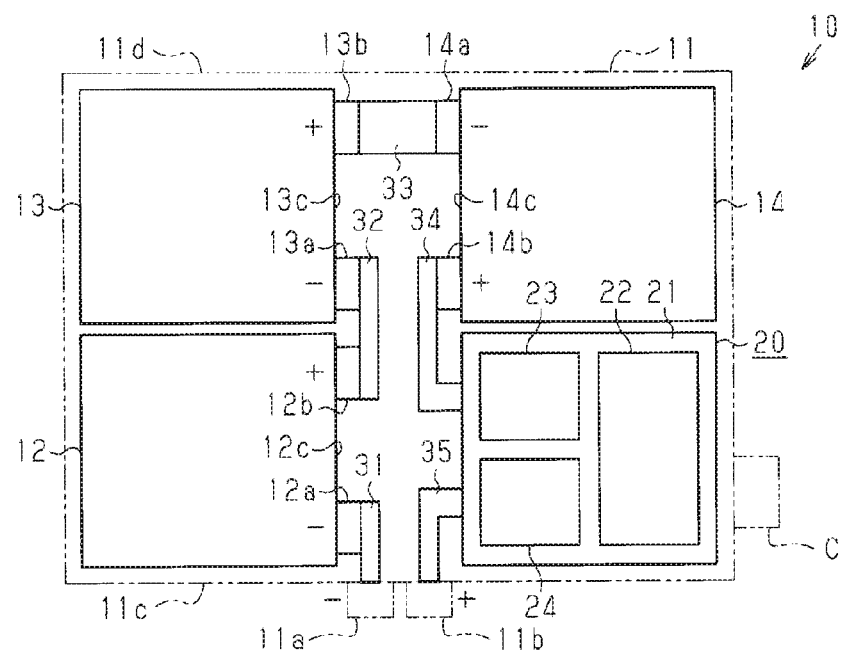
FIG. 2 is a plan view of the battery according to the embodiment of FIG. 1.

As shown in FIGS. 1 and 2, a battery 10 of this embodiment includes a housing 11 having an approximate shape of a flat box and an odd number (three in this embodiment) of cells 12, 13, and 14 contained in the housing 11. As shown in FIG. 2, a control unit 20 is also contained in the housing 11. It should be noted that all the components other than the housing 11 and the cells 12, 13, and 14 are omitted from the view of FIG. 1 to plainly show the arrangement of the cells in the housing 11.

Each of the cells 12, 13, and 14 is secured in place in the housing 11 by supporting members (not shown) for the cells. Each of the cells 12, 13, and 14 is formed in an approximate shape of a flat box. Each of the cells 12, 13, and 14 is provided with a negative electrode 12a, 13a, and 14a and a positive electrode 12b, 13b, and 14b, respectively. The surface of each cell 12, 13, and 14 on which the negative electrode 12a, 13a, or 14a and the positive electrode 12b, 13b, or 14b are provided will be hereinafter referred to as the electrode surface 12c, 13c, or 14c. Each cell 12, 13, and 14 is constructed in an identical manner.

The three cells 12, 13, and 14 are arranged so that the shortest of their three sides is oriented along the direction of thickness (Dt). The thickness direction of the housing 11 also coincides with the thickness direction of each cell 12, 13, and 14.

Two cells 12 and 13 of the three cells 12, 13, and 14 are arranged adjacent to each other so that their two electrode surfaces 12c and 13c face the same direction. In this arrangement of the two adjacent cells 12 and 13, the positive electrode 12b of the cell 12 and the negative electrode 13a of the other cell 13 are located adjacent to each other.

The electrode surface 13c of the cell 13 is disposed opposite to the electrode surface 14c of the cell 14. More specifically, the cell 13 and the cell 14 are arranged so that the negative electrode 13a of the cell 13 opposes the positive electrode 14b of the cell 14 and the positive electrode 13b of the cell 13 opposes the negative electrode 14a of the cell 14.

In the foregoing configuration, the cell 12 and the cell 13 form a first row while the cell 14 forms a second row. This naturally creates a large enough space S next to the second row cell 14 in the flat-box shaped housing 11 to contain any one of the cells 12, 13, and 14. This space S is filled with the control unit 20.

The control unit 20 is configured to have about the same size as or a smaller size than the foregoing space S. The control unit 20 has a control circuit 22, a shunt resistor 23 for voltage measurement (a current detection circuit), and a voltage step-up and down circuit 24 on a circuit board 21. The control circuit 22 is electrically connected to a connector C exposed to the outside of the housing 11. Accordingly, the control circuit 22 is capable of transmitting and receiving electrical signals to and from external devices coupled to the connector C.

In this embodiment, the control unit 20 is disposed so that the thickness direction of the circuit board 21, having an approximately square shape, coincides with the thickness direction of each cell 12, 13, and 14. Furthermore, the control unit 20 is disposed adjacent to the cell 14 and opposite to the cell 12. In this configuration, the shunt resistor 23 and the voltage step-up and down circuit 24, which tend to generate heat, are set on the side of the circuit board 21 that faces the cell 12.

The following describes the electrical connections among the cells 12, 13, and 14, the control unit 20, and bolt terminals 11a and 11b provided on and exposed to the outside of the housing 11.

The negative bolt terminal 11a, exposed to the outside of the housing 11, is electrically connected to the negative electrode 12a of the cell 12 via a bus bar 31. The positive electrode 12b of the cell 12 is electrically connected to the negative electrode 13a of the adjacent cell 13 also in the first row via a bus bar 32. The positive electrode 13b of the cell 13 is electrically connected via a bus bar 33 to the negative electrode 14a of the cell 14 in the second row, which is orthogonally opposite to the electrode surface 13c. The bus bar 33 is located closer to a second side 11d of the housing 11 than to a first side 11c on which the terminals 11a and 11b are provided, the second side 11d being located opposite to the first side 11c. The bus bar 33 connects the different electrodes 13b and 14a of the cells 13 and 14, which are in different and opposite rows. The bus bar 33 constitutes a folding portion (returning portion) that folds back (returns) the current path between the terminals 11a and 11b.

The positive electrode 14b of the cell 14 is electrically connected to the adjacent control unit 20 via a bus bar 34. The control unit 20 is electrically connected via a bus bar 35 to the positive bolt terminal 11b, which is exposed to the outside of the housing 11.

The operation of the battery 10 of this embodiment will be described hereinafter.

The battery 10 of this embodiment is charged and discharged (supplies power) based on the controlled charge and discharge of the cells 12, 13, and 14 by the control unit 20. In the battery 10 of this embodiment, the thickness direction of the flat-box shaped cells 12, 13, and 14 coincides with the thickness direction of the circuit board 21, and the circuit board 21 (the control unit 20) opposes the cell 12 in a direction orthogonal to the thickness direction and is located adjacent to the cell 14. This limits the size of the battery in the thickness direction of the cells 12, 13, and 14.

The effects of this embodiment will be described hereinafter.

(1) As the current path between the two terminals 11a and 11b is folded back by the bus bar 33, which serves as a folding portion, it is possible to shorten the current path between the two terminals 11a and 11b, which face the same direction. This makes it possible to shorten the bus bars.

(2) As the electrodes 13a and 13b of the cell 13 in the first row oppose the electrodes 14a and 14b of the cell 14 in the second row, the distance of connection between these opposing electrodes can be shortened, thus making it possible to shorten the bus bar 33, which forms the folding portion. In addition, as the adjacent cells 12 and 13 are arranged to dispose the electrodes 12b and 13a, which have different polarities, close to each other, it is possible to further shorten the bus bar 32 and thus the current path.

(3) As the control unit 20 is smaller than or equal in size to a rectangular solid having the smallest possible volume that can contain one cell, the cells 12, 13, and 14 and the control unit 20 can be efficiently arranged in the housing 11.

(4) As an odd number of cells, i.e., the three cells 12, 13, and 14, and a single control unit 20 are held in the housing 11, the cells 12, 13, and 14 and the control unit 20 can be efficiently arranged in the housing 11.

(5) The shunt resistor (current detection circuit) 23 and the voltage step-up and down circuit 24, which tend to generate heat, are arranged on the circuit board in such a way to face the same direction as the electrodes of the adjacent cell 14 face. That is, as the shunt resistor (current detection circuit) 23 and the voltage step-up and down circuit 24 are arranged close to the area where the current path is concentrated, thermal diffusion can be minimized.

[The foregoing embodiment may be modified as set forth below.

Although the odd number of cells is three, the cells 12, 13, and 14, in the foregoing embodiment, it is not limited to this. For example, the number of cells may be five or a greater odd number. Even in this case, as in the foregoing embodiment, as there will always be one more cell in one of the two rows of cells than in the other row, the control unit 20 can be provided in the row with fewer cells. There may also be only one cell. Alternatively, there may also be an even number of cells.

Although the shunt resistor 23 and the voltage step-up and down circuit 24, which tend to generate heat (easily reach high temperature), are arranged close to the electrode surfaces 12c and 14c, their arrangement is not limited to this; the shunt resistor 23 and the voltage step-up and down circuit 24 may be spaced apart from each other.

Although not specifically referred to in the foregoing embodiment, a heat sink 40 may also be provided on the control unit 20 (the circuit board 21) to serve as a radiator member as shown in FIGS. 3 and 4.

The heat sink 40 shown in FIG. 3 is in contact only with the circuit board 21 of the control unit 20 to mainly radiate the heat from the control unit 20. Additionally, as shown in FIG. 3, if the thickness of the control unit 20 is, for example, smaller than that of a cell (the cell 12 in FIG. 3), the size of the battery 10 as a whole can be limited in the thickness direction of the cells by providing the heat sink 40 only on the control unit 20.

The heat sink 40 shown in FIG. 4 is in contact with a cell (only the cell 12 in FIG. 4) in addition to the circuit board 21 of the control unit 20. This radiates the heat also from the cell.

In the foregoing embodiment, although the cells 12 and 13 in the first row oppose the cell 14 in the second row in a direction orthogonal to the thickness direction of the cells, it is not limited to this.

For example, as shown in FIG. 5, the plurality of cells 12, 13, and 14 may be stacked in two tiers in the thickness direction in a manner that causes all of the two electrodes 12a, 12b, 13a, 13b, 14a, 14b of the plurality of cells 12, 13, and 14 to face the same direction. In the configuration shown in FIG. 5, the cell 12 and the cell 13 are the first tier cells while the cell 14 is the second tier cell. As in FIG. 1, all of the components other than the housing 11 and the cells 12, 13, and 14 are omitted from the view of FIG. 5 to plainly show the arrangement of the cells in the housing 11.

In this case, the space S for containing the control unit 20 is located facing the cell 12 in the thickness direction and adjacent to the cell 14 in the housing 11. Additionally, as the electrode surfaces 12c, 13c, and 14c are arranged to face the same direction, the connection distances among the electrodes 12a, 12b, 13a, 13b, 14a, 14b can be shortened, thus shortening the current path. Moreover, in such a configuration, it is preferred to arrange the adjacent cells 12 and 13 in the first tier such that the adjacent electrodes 12b and 13a of different polarities are placed close to each other and these closely placed electrodes 12b and 13a of different polarities are electrically connected to each other. In this way, as the differently polarized electrodes 12b and 13a of the adjacent cells 12 and 13 are located close to each other, it is possible to further shorten the bus bar 32 and thus the current path.

The cells may also be arranged in two rows and in a plurality of tiers. The following describes arrangement of cells in two rows and two tiers, for example. As shown in FIG. 1, the cells in the first tier are three cells arranged in two rows. The two electrodes of a cell in the first row oppose the two electrodes of the cell in the second row, the two adjacent cells in the same row are arranged so that electrodes of different polarities are adjacent to each other, and the adjacent electrodes of different polarities are electrically connected to each other. The cells in the second tier comprise four cells arranged in two rows. In other words, one cell is also provided in the space corresponding to the space S in FIG. 1. As in the cells in the first tier, the two electrodes of each cell in the first row oppose the two electrodes of a cell in the second row, the two adjacent cells in the same row are arranged so that electrodes of different polarities are adjacent to each other, and these adjacent electrodes of different polarities are electrically connected to each other. As a result, the cells in the same row in the different tiers are arranged in such a way as to cause the two electrodes of each of the cells to face the same direction. As shown in FIG. 1 and FIG. 2, a wiring member (bus bar) located closer to a second side 11d of the housing than to a first side 11c on which the terminals are provided, the second side being opposite to the first side 11c, connects electrodes of different polarities of at least one pair of opposite cells in the different rows to each other. In this way, the current path is folded back between the terminals 11a and 11b.

One or more features described in the foregoing embodiment can be combined as required with any other one or more features described in the foregoing embodiment and/or with any other one or more features described in any of the modifications.

The invention claimed is:

1. A battery comprising:
a plurality of cells, each of which has two electrodes, the plurality of cells are arranged in two rows so that the two electrodes of each cell oppose those of another, the two adjacent cells in each row are arranged so that electrodes of different polarities are adjacent to each other, and the adjacent electrodes of different polarities are electrically connected to each other;

a control unit for controlling charge and discharge of the plurality of cells, the control unit having a circuit board; and a housing that contains the plurality of cells and the control unit, the housing having a first side on which first and second terminals are provided;

wherein the first and second terminals are arranged on the first side, facing in the same direction;

wherein a terminal side cell of the plurality of cells is disposed closest to the first terminal is connected to the first terminal;

wherein a control unit side cell of the plurality of cells is disposed adjacent to the control unit is connected to the second terminal via the control unit;

wherein the control unit is disposed closest to the second terminal among the plurality of cells and the control unit; and wherein a folding portion that returns a current path between the first and second terminals is provided between the terminal side cell and the control unit side cell, the folding portion is located closer to a second side of the housing than to the first side of the housing, the second side being located opposite to the first side, and the folding portion is composed of a wiring member that connects electrodes of different polarities of at least one pair of opposite cells in the different rows.

2. The battery according to claim 1, wherein:
the plurality of cells are arranged in two tiers so that the two electrodes of the plurality of cells all face the same direction, two adjacent cells in each tier are arranged so that electrodes of different polarities are adjacent to each other, and the adjacent electrodes of different polarities are electrically connected to each other;
the folding portion is located closer to a second side of the housing than to the first side of the housing, the second side being located opposite to the first side, and the folding portion is composed of a wiring member that connects electrodes of different polarities of two cells in the different tiers.

3. The battery according to claim 2, wherein an outer contour of the plurality of cells has approximately a shape of a polygonal column or a cylinder, and the two electrodes protrude from one surface of each cell in the same direction; and
the control unit is equal in size to a rectangular solid having the smallest possible volume that can contain one of the plurality of cells or is sized to be contained in that rectangular solid.

4. The battery according claim 2, wherein the housing has an approximate shape of a flat box and contains three or a greater odd number of the cells, and the control unit.

5. The battery according to claim 2, wherein a radiator member is provided on the control unit.

6. The battery according to claim 1, wherein:
an outer contour of the plurality of cells has approximately a shape of a polygonal column or a cylinder, and the two electrodes protrude from one surface of each cell in the same direction; and
the control unit is equal in size to a rectangular solid having the smallest possible volume that can contain one of the plurality of cells or is sized to be contained in that rectangular solid.

7. The battery according claim 6, wherein the housing has an approximate shape of a flat box and contains three or a greater odd number of the cells, and the control unit.

8. The battery according to claim 6, wherein a radiator member is provided on the control unit.

9. The battery according to claim 1, wherein:
the housing has an approximate shape of a flat box and contains three or a greater odd number of the cells, and the control unit.

10. The battery according to claim 9, wherein a radiator member is provided on the control unit.

11. The battery according to claim 1, wherein:
a radiator member is provided on the control unit.

12. The battery according to claim 11, wherein:
the radiator member is in contact with at least one of the plurality of cells.

13. The battery according to claim 12, wherein the control unit includes a current detection circuit, a voltage step-up and down circuit, and a control circuit on the circuit board; and
the current detection circuit and the voltage step-up and down circuit are arranged on the circuit board, facing in the same direction as the electrodes of the control unit side cell.

14. The battery according to claim 1, wherein:
the control unit includes a current detection circuit, a voltage step-up and down circuit, and a control circuit on the circuit board; and
the current detection circuit and the voltage step-up and down circuit are arranged on the circuit board, facing in the same direction as the electrodes of the control unit side cell.

* * * * *